United States Patent [19]

Kushibiki et al.

[11] Patent Number: 5,708,099
[45] Date of Patent: Jan. 13, 1998

[54] POLYSILOXANE RESIN CONTAINING OPTICALLY-FUNCTIONAL CONSTITUENTS AND TRANSPARENT OPTICALLY-FUNCTIONAL ELEMENT OBTAINED THEREFROM

[75] Inventors: Nobuo Kushibiki; Kikuko Takeuchi, both of Kanagawa, Japan

[73] Assignee: Dow Corning Asia, Ltd., Tokyo, Japan

[21] Appl. No.: 743,599

[22] Filed: Nov. 4, 1996

[30] Foreign Application Priority Data

Nov. 6, 1995 [JP] Japan ................... 7-287670

[51] Int. Cl.⁶ ........................ C08G 77/26
[52] U.S. Cl. ............... 525/477; 528/35; 528/43
[58] Field of Search ............... 525/477; 528/35, 528/43

[56] References Cited

U.S. PATENT DOCUMENTS

| 4,278,804 | 7/1981 | Ashby et al. | 528/43 |
| 4,372,835 | 2/1983 | Chung et al. | 204/159.13 |
| 4,373,060 | 2/1983 | Ching | 524/767 |
| 4,414,349 | 11/1983 | Vaughn, Jr. et al. | 524/261 |
| 5,391,795 | 2/1995 | Pickett | 556/436 |

FOREIGN PATENT DOCUMENTS 3041155  2/1991  Japan.

Primary Examiner—Margaret W. Glass
Attorney, Agent, or Firm—James E. Bittell

[57] ABSTRACT

The invention is an optically transparent organopolysiloxane resin with a large amount of a uniformly dissolved and dispersed optically-functional organic material. The compatibility of the optically functional material is achieved by modifying it by addition of alkoxysilylalkyl groups to aromatic groups of optically-functional organic compounds such phthalocyanines, porphyrins, tetraphenylbutadienes, axobenzenes, bis(4-dimethylaminodithiobenzyl)nickel and anthracenes. The compositions contain 20 to 200 parts by weight of the modified optically-functional organic compounds per 100 parts by weight of the organopolysiloxane resin. The composition may be formed into a specified shape, solvents evaporated, and cured by heat.

9 Claims, No Drawings

POLYSILOXANE RESIN CONTAINING OPTICALLY-FUNCTIONAL CONSTITUENTS AND TRANSPARENT OPTICALLY-FUNCTIONAL ELEMENT OBTAINED THEREFROM

BACKGROUND OF THE INVENTION

This invention is a method for making an organopolysiloxane material containing an optically-functional constituent and to the material made by the method which can be used to manufacture transparent optically-functional devices. The material is prepared by mixing a silyl modified, optically-functional organic compound with an organopolysiloxane resin.

Optically-functional organic materials play important roles in the field of photoelectronics and photonics. Considerable attention has also been directed to dissolving and dispersing optically-functional organic material in polymer. This is because workability of the optically-functional organic materials presents a continual problem during their processing. Examples of encapsulating polymers used include soluble matrix materials known as organic glass, initially in the form of polymethylmethacrylate and polycarbonate. However, the organic encapsulating polymers have the disadvantages that the entrapped optically-functional organic materials are normally subject to such defects as development of multiple refraction, shrinkage during processing, deterioration of properties under the effect of laser beams or other irradiation sources, etc.

In recent years, particular attention has been given to the so called solgel glass which possesses an inorganic glass-like structure. For example, a solid, state tunable laser is described consisting of a solgel glass doped with a pigment such as coumarin, xanthane, oxazine, etc by Jeffrey I. Zink and Bruce S. Dunn, *Nihon Seramikkusu Kyokai Gakugi Jutsu Ronbunshi* (*Transactions of the Japan Ceramics Association*, vol 99, pg. 878–893, 1991). However, since solgel synthesis is performed with in a solvent principally composed of water, several drawbacks are present. These include difficulty in handling non-water-soluble organic materials, easy degradation of the organic substances since the catalyst used during synthesis is of an acid or alkali origin, a long period of time required for the synthesis reaction, the occurrence of cracks during the drying process, difficulties in forming the product into large or complicated shapes, etc. Furthermore, since the solgel glass is coarse, changes occur with the lapse of time and the dispersed organic substance is subject to aggregation.

Polysiloxane resin is an optically transparent highly polymeric material having good light resistance. Studies have been conducted to determine whether an optically-functional organic molecule can be dispersed in polysiloxane resins. It has been disclosed that various organic compounds may be dispersed within a ladder-type polysiloxane resin (see Japanese Laid-Open Patent Application No. 03-41155). However, in respect to optical characteristics of the resin, only an organic molecule at an extremely low degree of concentration, e.g., not exceeding 10 parts by weight per 100 parts by weight of the resin, may be uniformly dispersed. Practical applications for such uses have been limited for the ladder-type polysiloxane resin since such organic molecules are extremely incompatible with the polysiloxane resin and since aggregation and light scattering occur.

Polysiloxane resin has extremely desirable qualities as a medium for the dispersion of optically-functional organic materials because it is resistant to light degradation and transmits light in a broad range of wavelengths. Such properties result from optically inactive nature of the resin. Currently, however, since miscibility of the resin with optically-functional material is poor, the use of optical materials, including optically-functional organic materials, in polysiloxane resin finds very limited application. It has not been possible to disperse a large amount of an optically-functional organic material in a polysiloxane resin. Therefore, it is the object of the present invention to provide an optically transparent polysiloxane resin with a large amount of an optically-functional organic material uniformly dissolved and dispersed throughout the resin.

SUMMARY OF THE INVENTION

The invention is a composition comprising the product obtained upon mixing an organopolysiloxane resin and optically-functional constituent represented by the formula

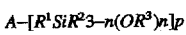

wherein A is an optically-functional organic group containing aromatic hydrocarbon groups where at least one of the aromatic hydrocarbon groups is bonded to $R^1$ which is an alkylene group having 1 to 18 carbon atoms, $R^2$ is a monovalent hydrocarbon group or a halogen-substituted hydrocarbon groups having 1 to 15 carbon atoms, $R^3$ is an alkyl group having 1 to 6 carbon atoms, n is an integer from 1 to 3, and p is an integer from 1 to 3. The compositions may contain 10 to 200 parts by weight of the optically-functional constituent per 100 parts of the organopolysiloxane resin. The invention also relates to a transparent optically-functional devices which can be obtained by forming the composition into a desired shape, removing the solvents, and curing by heating.

DESCRIPTION OF THE PREFERRED EMBODIMENTS

The preferred optically-functional constituent is represented by the formula

 (1)

where A is a group derived from an optically-functional organic compound, $R^1$ is an alkylene with the number of carbon atoms in the range of 1 to 6, $R^2$ is a monovalent hydrocarbon group which contains a halogen and which has the number of carbon atoms in the range of 1 to 15 and preferably in the range of 1 to 6, $R^3$ is an alkyl group with the number of carbon atoms in the range of 1 to 6, n is an integer from 1 to 3, and p is an integer from 1 to 3. The term "derived" refers to the removal of a hydrogen atom or its substituent group from the optically-functional organic compound without the loss of functionality by said compound, even though the hydrogen or the group has been removed.

The organic compound which may be used to form the optically-functional constituent is a compound which absorbs light energy and undergoes physico-chemical changes such as photo-ionization, emission, non-linearity effect, photochromism, photo electrical photo optical effect, etc. Preferable among these compounds are those that contain in their molecules aromatic groups. Examples of these include, phthalocyanine, porphyrin, tetraphenylbutadiene, azobenzene, and BDN a [bis(4-dimethylaminodithiobenzyl) nickel].

Known methods may be utilized to introduce an alkoxysilyl group into the optically-functional organic compound.

For example, when the optically-functional organic compound has an aromatic group, first an unsaturated hydrocarbon substituent is introduced into the aromatic group, then an alkoxysilane such as methoxysilane or ethoxysilane, etc., is added by a hydrosilylation reaction. In addition, a method exists wherein a methyl group is subjected to bromomethylization, a lithio-complex is formed through reaction with organic lithium compounds, and alkoxyhalosilane is reacted. Furthermore, a vinyl group may be introduced to an aromatic group by halogenating the hydrogen of a methyl group substituent of an aromatic ring, subjecting the product to formylization, and finally dehydrating the aldehyde.

The type of optically-functional organic compound determines into which position of the aromatic group the alkoxysilyl group should be introduced. Further, when there is a plurality of aromatic groups it is not necessary that an alkoxysilyl group be bond to all of the aromatic groups. This number of alkoxysilyl groups should be selected to provide the desired level of solubility in the organopolysiloxane resin.

A silane containing hydrogen and alkoxy substituents is reacted with a vinyl substituent of the optically-functional organic compound. An SiH group in the silane is required for the hydrosilylation reaction with the vinyl group; hydrolyzable group, such as the alkoxy group, $OR^3$, are also required in the silane. The $R^3$ in the $OR^3$ alkoxy group is selected from relatively short straight or branched alkyl chains such as methyl, ethyl, propyl, butyl, amyl, and hexyl, or similar groups having 1 to 6 carbon atoms. The selection is made according to the intended use of the product, according to the stability during the hydrosilylation process and the ease of hydrolysis desired. Further, the alkoxyhalosilane which is allowed to react with the lithio-complex may be one where in the place of hydrogen, a halogen atom such as chlorine, bromine, etc. is bonded to silicon.

The organic group $R^2$ which is directly bonded to the silicon atom, may be selected as appropriate according to the type of substituent on the silicon in the organopolysiloxane resin, and according to the various purposes such as the solubility in the resin, reactivity during the hydrosilylation reaction, and other property adjustments of the organopolysiloxane resin. The selection can be made from the following: alkyl groups such as methyl, ethyl, propyl, butyl, amyl, and hexyl; alkenyl groups such as vinyl and allyl; aryl groups such phenyl and tolyl halogenated hydrocarbon groups such as chloromethyl and chloroethyl; and fluorohydrocarbon groups represented by trifluoropropyl, heptafluoropentyl, and nanofluorohexyl. If the substituent on the silicon in the organopolysiloxane resin is methyl, it is likely that the solubility in the resin will be better if the $R^2$ is a methyl group.

It is recommended that an organopolysiloxane resin be used where the substitution number of monovalent organic groups per silicon atom is 0.5 to 1.5. This range is particularly suitable with respect to processability and mechanical strength. If the substitution number is less than 1, the structure will be close to glass, and if it is lower than 0.5, it would be difficult to form a film. When the number exceeds 1, the tendency is opposite, and when the number is equal to 2, a polydimethylsiloxane is formed. When the range exceeds 1.5, rubber properties begin to prevail and mechanical strength decreases and the coefficient of thermal expansion increases and becomes on the order of $10^{-3}$ such that temperature exerts a greater influence on resin dimensions. The monovalent hydrocarbon group which is bonded directly to a silicon atom may be a saturated hydrocarbon group irrespective of branched or straight chains with 1 to 15 carbon atoms. This group is selected, e.g., from methyl, ethyl, propyl, butyl, amyl, hexyl, 2-ethylhexyl, dodecyl, octadecyl, and the like; alkenyl groups such as vinyl, allyl; aryl groups such as phenyl and tolyl; halogenated hydrocarbon groups such as trifluoropropyl, heptafluoropentyl, nanofluorohexyl or a similar fluorohydrocarbon group; as well as chloromethyl, chloroethyl or similar. It is not necessary that the monovalent hydrocarbon groups which are bonded directly to silicon atoms be groups of the same type. These groups may be optionally selected for the purpose of improving optical properties, mechanical properties, solubility in the solvent, etc. It is known, for example, that a resin containing both methyl groups and phenyl groups provides better affinity with respect to organic compounds than methyl groups alone. Under the effect of phenyl groups the transmission wavelength band is shifted toward the long wavelengths.

In the polysiloxane resin, hydrolyzable groups, e.g., hydroxyl groups, which are bonded to silicon atoms in the molecule remain as residual groups. When too many of these hydrolyzable groups remain, there is a strong tendency for gelation to occur in the polysiloxane resin during storage, thus decreasing storage stability. On the other hand, when too few residual groups remain, crosslinking may be hindered. Therefore, the hydrolyzable groups bonded to the silicon atom in the polysiloxane resin should be present in the range of 0.01 wt. % or more to 10 wt. % or less, and preferably in the range of 0.1 wt. % or more to 4 wt. % or less as calculated based on the hydroxyl groups. The actual amount of these hydroxyl groups may be adjusted using known methods e.g., by adding alkoxysilane during synthesis of the organopolysiloxane resin.

Addition of a cross-linking agent to the resin ensures cross-linking of its structure. There are no special limitations with regard to the cross-linking agent, provided it is a silicone compound having siloxane bonds with several hydrolyzable groups in one molecule. These hydrolyzable groups can be represented by a hydroxyl group, methoxy, ethoxy, propoxy, butoxymethyl ethyl ketoximo group, diethylamino group, acetoxy group, and propynoxy group. There are no particular limitations also with regard to substituents that may be bonded to silicon atoms other than to hydrolyzable groups, provided they are monovalent hydrocarbons. A catalyst is not necessary for hardening the resins. However, the use of a curing catalyst of the type employed with conventional organopolysiloxane resins is not precluded. With regard to the curing temperature and the time required for curing, such a catalyst may be selected from the group consisting of dibutyltin diacetate, dibutyltin dilaurate, dibutyltin dioctoate or a similar organic acid salt, butyl titanate or a similar titanic acid ester. These should be selected so as not to interfere with the function of the optically-functional constituent.

A method for the manufacture of a polysiloxane resin is disclosed in Japanese Patent Publications [Kokoku] 26-2696 and [Kokoku] 28-297. Further details of siloxane polymer synthesis methods are described in "Chemistry and Technology of Silicones" by Walter Noll, Academic Press, Inc., 1968, p. 191.

The mixing ratio for the components is in the range of 20 to 200 parts by weight optically-functional constituent per 100 parts by weight of organopolysiloxane resin. The mixing ratio will vary with respect to the specific optically-functional constituent used and the optical function which is targeted.

The method for mixing the organopolysiloxane resin and optically-functional constituent comprises dissolving both in a solvent and mixing. Examples of suitable solvents include alcohol, ketone, ester, aromatic hydrocarbon, halogenated aliphatic hydrocarbon or similar organic solvents. They may be appropriately selected in regard to the specific optically-functional constituent used, the specific organopolysiloxane used, the method for forming, etc. Devices and optical elements may be formed from the resin mixture by applying the resin on an appropriate substrate or pouring it into a mold, removing the solvent, and subsequently curing the product by the addition of heat at a temperature within the range from room temperature to 200° C. In addition, curing may be achieved by ultrasonic waves, far infrared radiation, etc.

The invention provides an organopolysiloxane resin having optical-functionality. By mixing a polysiloxane resin with an organic optically-functional material modified by an alkoxysilane substituent, it is possible to obtain a polysiloxane resin with high content of the optically-functional organic material. Such a material is suitable for use in electro-optical and photonic devices, as well as a material for optical memory recording.

EXAMPLE 1

9-[2-triethoxysilyl)ethyl]anthracene

Chloroplatinic acid (10 μg) and triethoxysilane (8.2 g) were dissolved in toluene (30 ml) in a three-necked flask and heated to 65° C. 9-vinyl anthracene (5.2 g) was dissolved in toluene (35 ml) and dripped with a funnel into the three-necked flask. The solution was stirred for 24 hours. The toluene was subsequently removed and separated from the product. A lemon-yellow liquid with high viscosity was obtained. $^1$H NMR indicated the following: vinyl group (5.5 to 6.0 ppm) and Si-H group (4.2 ppm) signals were extinguished and new $CH_2$ group signals (1.0 to 1.1 ppm and 2.7 to 2.8 ppm) were generated.

The 9-[2-triethoxysilyl)ethyl]anthracene obtained above and 10 g of silicone resin with 80 mol % methylsiloxane units and 20 mol % dimethylsiloxane units, was dissolved in 10 g of toluene. Then, 5.3 g of methyltri(methoxy)silane and 0.2 g of dibutyltin diacetate were added, and a uniform solution was formed. Using a bar coater the solution was applied to a glass plate. It was dried at a temperature of 140° C. and cured for 15 hours. Observation with a microscope revealed that crystallization had not occurred, and a uniform film had formed. The film was dipped in a solution of ethanol and water, and the absorption spectrum of the film was measured using a spectrometer (Hitachi model U-3210). The transmission factor of the film was 88% at 600 nm. A florescence peak and phosphorescence peak were observed in the film at approximately 375 nm and 670 nm, respectively.

We claim:

1. A method of manufacturing an organopolysiloxane material containing an optically-functional constituent, the method comprising mixing 100 parts by weight of an organopolysiloxane resin having a substitution number of monovalent organic groups per silicon atom within the range of 0.5 to 1.5 wherein the monovalent organic groups substituted on the silicon atoms of the organopolysiloxane resin are monovalent hydrocarbon groups or halogen-substituted monovalent hydrocarbon groups having 1 to 15 carbon atoms and the organopolysiloxane resin contains 0.01 to 10 weight percent of hydroxyl groups on silicon atoms and 10 to 200 parts by weight of an optically-functional constituent represented by the formula

$A-[R^1SiR^2{}_{3-n}(OR^3)_n]p$ wherein A is an optically-functional organic group containing aromatic hydrocarbon groups where at least one of the aromatic hydrocarbon groups is bonded to $R^1$ which is an alkylene group having 1 to 18 carbon atoms, $R^2$ is a monovalent hydrocarbon group or a halogen-substituted hydrocarbon groups having 1 to 15 carbon atoms, $R^3$ is an alkyl group having 1 to 6 carbon atoms, n is an integer from 1 to 3, and p is an integer from 1 to 3 wherein the optically-functional organic group is selected from groups consisting of phthalocyanine groups, porphyrin groups, tetraphenylbutadiene groups, azobenzene groups, bis(4-dimethylaminodithiobenzyl)-nickel groups and anthracene groups.

2. The method of claim 1 wherein the monovalent organic groups substituted on the silicon atoms of the organopolysiloxane resin are selected from alkyl groups, alkenyl groups, aryl groups, fluoro-substituted alkyl groups, and chloro-substituted alkyl groups and the organopolysiloxane resin contains 0.1 to 4 weight percent of hydroxyl groups on silicon atoms.

3. The method of claim 1 wherein the optically-functional constituent is 9-(2-triethoxysilylethyl)anthracene.

4. The organopolysiloxane material containing an optically-functional constituent prepared by the method of claim 1.

5. The organopolysiloxane material containing an optically-functional constituent prepared by the method of claim 2.

6. The organopolysiloxane material containing an optically-functional constituent prepared by the method of claim 3.

7. A transparent optically functional device made by forming the organopolysiloxane material, prepared by the method of claim 1, into a desired shape and then curing the organopolysiloxane material.

8. A transparent optically functional device made by forming the organopolysiloxane material, prepared by the method of claim 2, into a desired shape and then curing the organopolysiloxane material.

9. A transparent optically functional device made by forming the organopolysiloxane material, prepared by the method of claim 3, into a desired shape and then curing the organopolysiloxane material.

* * * * *